United States Patent
Christopher et al.

(10) Patent No.: US 10,807,183 B2
(45) Date of Patent: Oct. 20, 2020

(54) WELDING REMOTE POWER SUPPLY CONNECTION

(71) Applicant: ILLINOIS TOOL WORKS INC., Glenview, IL (US)

(72) Inventors: Mark Richard Christopher, Neenah, WI (US); John Walter Lundin, Appleton, WI (US); Troy Douglas Wilson, Appleton, WI (US); Tim Jay Reitmeyer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 860 days.

(21) Appl. No.: 15/339,100

(22) Filed: Oct. 31, 2016

(65) Prior Publication Data

US 2017/0129036 A1    May 11, 2017

Related U.S. Application Data

(60) Provisional application No. 62/253,102, filed on Nov. 9, 2015.

(51) Int. Cl.
*B23K 9/10* (2006.01)
*B23K 9/095* (2006.01)
*B23K 9/32* (2006.01)

(52) U.S. Cl.
CPC .......... *B23K 9/1087* (2013.01); *B23K 9/0956* (2013.01); *B23K 9/32* (2013.01)

(58) Field of Classification Search
CPC ....... B23K 9/1087; B23K 9/0956; B23K 9/32
See application file for complete search history.

(56) References Cited

U.S. PATENT DOCUMENTS

| 7,009,143 B2 * | 3/2006 | Mortendorfer ...... B23K 3/0384 |
| | | 219/121.46 |
| 7,180,029 B2 | 2/2007 | Ott |
| 9,012,807 B2 | 4/2015 | Ott et al. |
| 2007/0039934 A1 | 2/2007 | Enyedy et al. |
| 2013/0168374 A1 | 7/2013 | Christopher et al. |
| 2013/0186874 A1 | 7/2013 | Ihde et al. |

OTHER PUBLICATIONS

Notification of Transmittal of the International Search Report and the Written Opinion of the International Searching Authority, or the Declaration; PCT/US2016/060981; dated Feb. 8, 2017; 13 pages.

* cited by examiner

*Primary Examiner* — Christopher S Kim
(74) *Attorney, Agent, or Firm* — McAndrews, Held & Malloy, Ltd.

(57) ABSTRACT

Methods and apparatuses for welding remote power supply are disclosed. An example welding remote power supply includes a housing to house an electronic component. A connector secures an electrical cable to the housing, the electrical cable having at least one conductive wire and a sheathing. A conductive element is connected to the electronic component through the sheath and into contact with the conductive wire to electrically connect the conductive wire with the electronic component.

20 Claims, 8 Drawing Sheets

WELDING REMOTE POWER SUPPLY CONNECTION

RELATED APPLICATIONS

This application claims priority to U.S. Provisional Patent Application Ser. No. 62/253,102, filed Nov. 9, 2015. The entirety of U.S. Provisional Patent Application Ser. No. 62/253,102 is incorporated herein by reference.

FIELD OF THE DISCLOSURE

The disclosure relates generally to welding devices and systems, and more particularly to power supply connections for welding devices and systems.

BACKGROUND

Welding has been developed and refined for years, as one of the most widely used material joining technologies. Some welding systems utilize remote controls that enable an operator to vary operational welding parameters, such as amperage, with a wire feeder (e.g., a metal inert gas ("MIG") welding systems) or a remote control unit (e.g., tungsten inert gas ("TIG") and stick welding systems), at a location remote from the main power source. In two-wire systems, the weld cable transmits weld current between the power source and the feeder or remote control unit, and a separate control wire carries control signals between the power source and the wire feeder or remote control unit. In one-wire systems, the weld cable itself transmits both the weld current and the communications signals.

With welding machines commonly utilized at construction and other worksites, the machines, and especially the cables, are subjected to abuse in the form of high tension, abrasion, and shear as the power sources, wire feeders or remotes, and cables are manipulated by an operator around other obstacles common at a worksite. One downside to two-wire systems is that the control cable is fragile relative to the weld cable. The control cable is often crushed, snagged, cut, worn, or otherwise damaged, even under normal working conditions. Although communications of one-wire systems are transmitted over the weld cable, which has a larger diameter and is much stronger than the control wire, the weld cable is still subject to damage.

However, one-wire systems are particularly prone to damage at the end of the wire that enters the feeder or remote control unit. Specifically, the weld cable, which is typically an insulated cable, often fatigues close to where the cable enters the feeder or remote and has to be replaced. In order to replace the cable, the entire enclosure or housing has to be opened, allowing access to the interior where the cable can be reconnected electrically to the feeder or remote electrical components. Opening the enclosure risks exposure of sensitive electrical components and circuits to dust, metal shavings, other debris and other airborne contaminants, water, etc., which not only risks shortening device lifespan, but may even render the device inoperable.

Therefore, a device for connecting the weld cable to a feeder or remote to mitigate exposure of sensitive components to the environment is desirable.

BRIEF DESCRIPTION OF THE DRAWINGS

The drawings are not to scale. Where appropriate, the identical reference numerals are used to describe the identical and/or similar components.

DETAILED DESCRIPTION

Disclosed examples are described with respect to a welding system with a welding power source and a control remote module having a power supply connection. The examples of a control remote and power supply connection of the disclosure are applicable to power sources and remote control modules of a variety of welding systems, including welding systems incorporating MIG, TIG, stick, flux cored arc welding ("FCAW"), and other welding technologies, and combinations of welding technologies. Examples of the remote power supply connection may also be incorporated into other high-power, non-welding systems such as plasma cutting systems.

An example welding system as provided herein includes a power source connected to a torch via a welding cable. In an example, a control remote is connected along the length of the welding cable to provide control signals for the torch. For instance, the control remote can include an electrical controller, such as a user interface, having a switch or button to manipulate a welding parameter, as well as a display for providing information associated with the welding system. A lead from the electrical controller can be connected to a conductive wire within the welding cable, allowing a user to adjust the welding parameter of the welding system via the control remote. Additionally or alternatively, the welding cable is removably secured to the control remote at a surface exterior to the control remote housing, thereby ensuring that, during replacement or readjustment of a welding cable, the contents of the control remote are not exposed to environmental contaminants.

Figure 1:
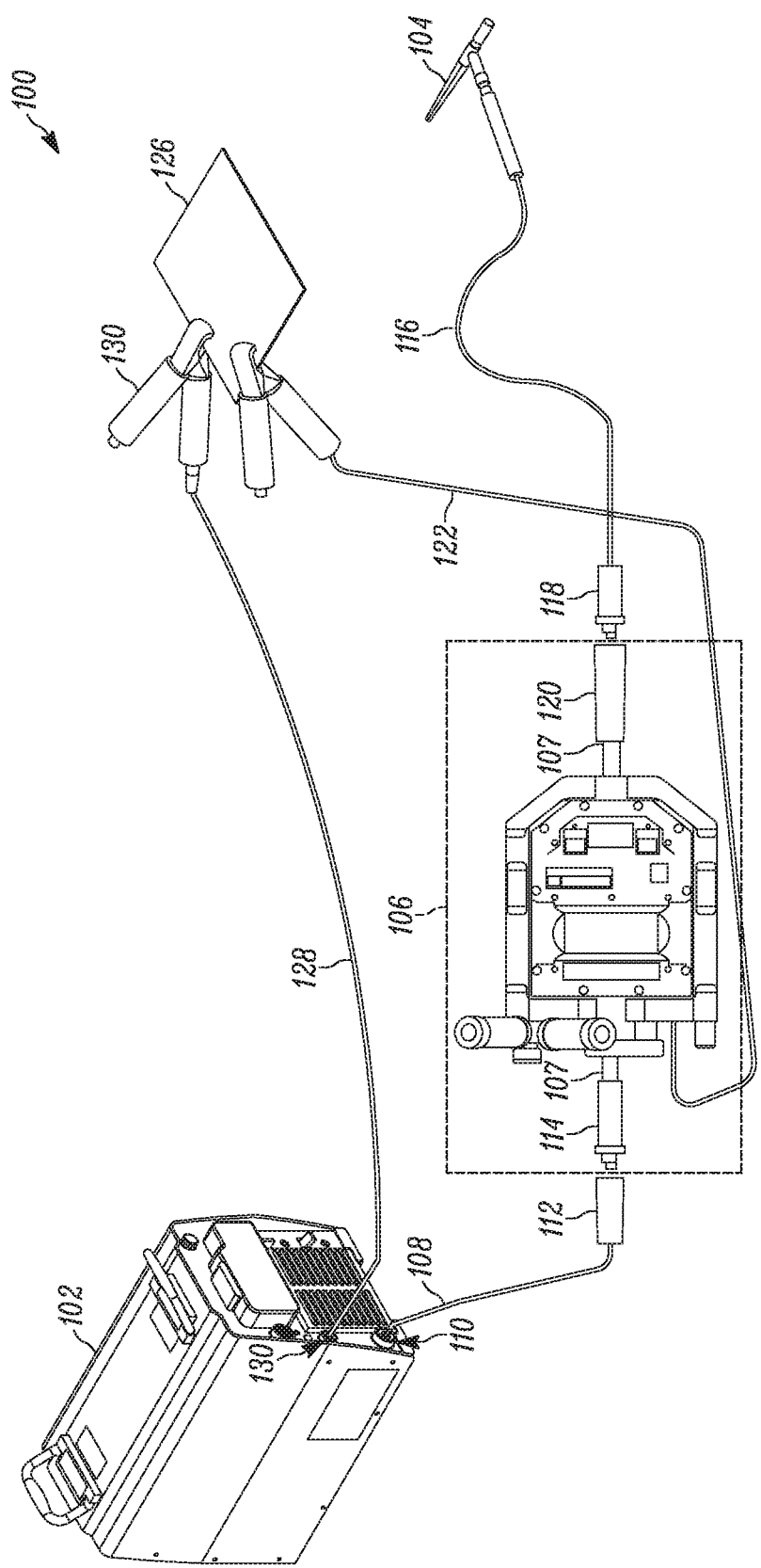
FIG. 1 depicts an example welding system including a power source, torch and control remote having a power supply connection.

FIG. 1 depicts a welding system 100 having a welding power source 102 electrically connected to a torch 104 via a series of welding cables, including a primary welding cable 108, a secondary welding cable 107, and a torch cable 116. A control remote 106 configured to remotely control the power source 102 is mechanically secured to and electrically taps into the secondary welding cable 107, as discussed in detail below.

Welding power source 102 includes one or more transformers (not shown) configured to convert electricity from a utility line or a generator and output the electricity to a usable form by the welding system. In some examples, the power source 102 runs on one of a number of modes including a voltage controlled mode (e.g., constant voltage ("CV")) and current controlled mode (e.g., constant current ("CC")). In some examples, the power supply 102 may be a 3-phase power supply, such as a Dimension™ 452 manufactured by Miller Electric Mfg. Co. of Appleton, Wis. In other examples, the power supply 102 may be a switched mode-based welding power supply, such as an XMT® 350 manufactured by Miller Electric Mfg. Co. of Appleton, Wis. In still other examples, the power supply 102 may be an engine-driven welding power supply, such as a Big Blue® 300 Pro manufactured by Miller Electric Mfg. Co. of Appleton, Wis. Any desired power supply may be utilized.

The torch 104 may be any suitable torch for welding, such as any desired TIG torch, MIG and/or FCAW gun, stick holder, cutting tool, and/or any other type of torch. As will also be recognized, a canister of shielding gas (not shown) may connect to the torch 104.

The welding power source 102 is regulated to enable a welding current to be provided from the welding power source over the weld cable 108. The weld cable 108 electrically connects the welding power source 102 to a secondary weld cable 107 (partially shown in FIG. 1). At one end, the weld cable 108 connects to a first welding terminal 110 of the power supply 102, and at another end, a female connection 112 of the weld cable 108 connects to a first connector 114 of the secondary weld cable 107.

The secondary weld cable 107 electrically connects the weld cable 108 to a torch cable 116 of the torch 104 to enable weld current to flow to the torch 104 during a welding operation. As shown, the torch cable 116 includes a male connector 118 configured to connect to a female connector 120 of the secondary power cable 107. Additionally or alternatively, the female connector 120 can connect with one or more accessories (e.g., a wire feeder, not shown). A power source work cable 128 electrically connects the workpiece 126 to the power source 102 to complete the welding circuit during a welding operation, as will be recognized. At one end, the power source work cable 128 includes a clamp 130 configured to be attached to the workpiece 126. At another end, the power source work cable 128 connects to a terminal 130 of the power source 102.

The control remote 106 electrically taps into the secondary power cable 107, as described in more detail below. The control remote 106 additionally includes a volt sense work cable 122 with a volt sense clamp 124 configured to be connected to a workpiece, such as the workpiece 126 shown, to electrically connect the control remote 106 and the workpiece 126. It will be recognized that a circuit is formed between the control remote 106 and the power source 102 via the primary weld cable 108, secondary weld cable 107, the control remote 106, volt sense work cable 122, workpiece 126, and the power source work cable 128. This electrical connection enables power transmission from the power supply 102 to the control remote 106 in order to power the control remote 106, and further enables an electrical path to communicate weld control signals between the power supply 102 and the control remote 106.

Figure 2:
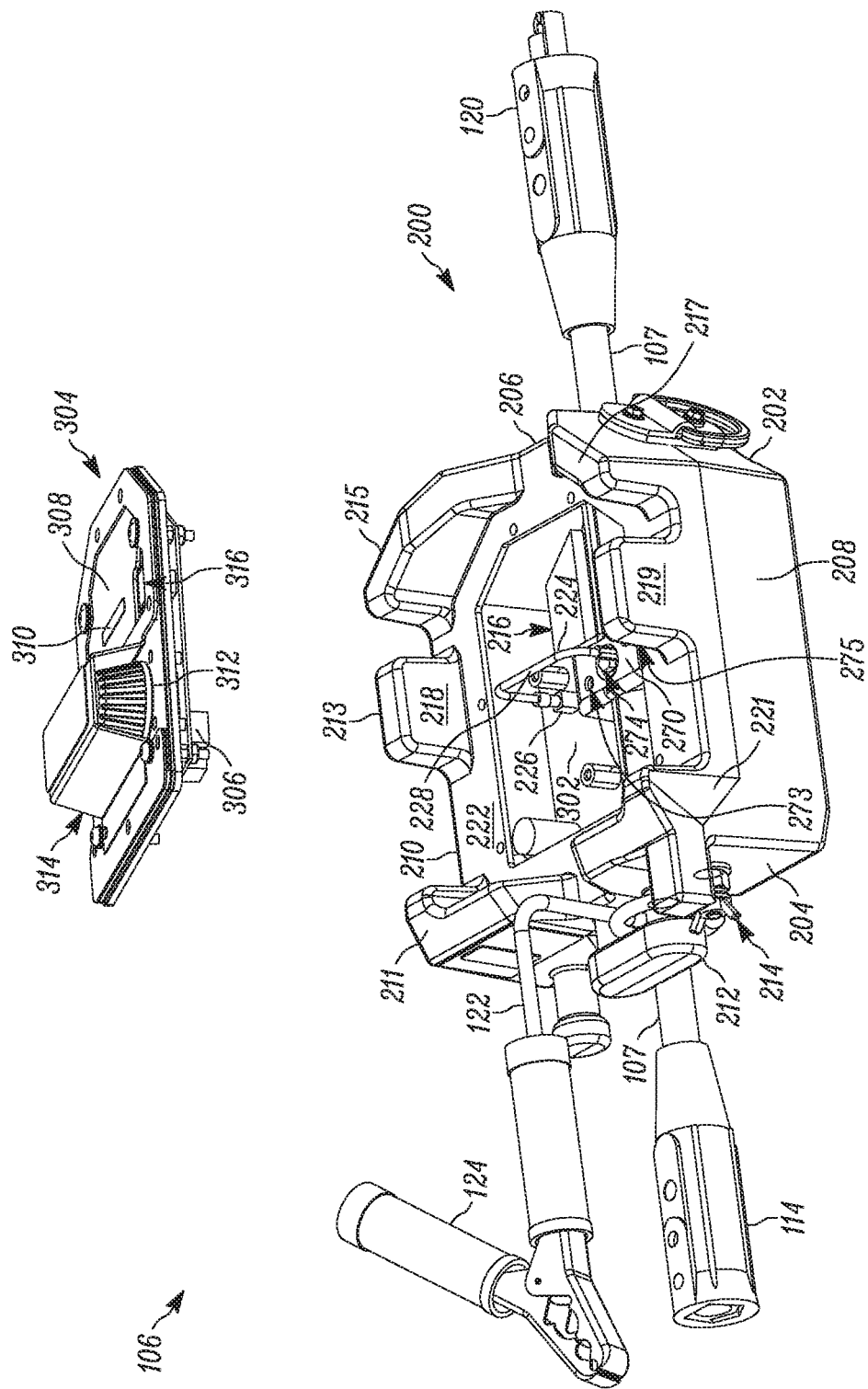
FIG. 2 depicts an upper perspective view of the control remote of FIG. 1 having a power supply connection.

FIG. 2 shows the upper side of the control remote 106. In the example depicted, the control remote 106 includes a connection assembly for a welding power supply remote interface 200, a power supply printed circuit board ("PCB") 302, and a user interface assembly 304. The connection assembly 200 includes a housing 202 having first through fourth sidewalls 204, 206, 208, 210. First sidewall 204 includes a post 212, and a terminal 214. As shown, an end of the volt sense work cable 122 is wrapped around the post 212, and is electrically connected to the terminal 214. Wrapping the end of the volt sense work cable 122 around the post 212 so as to be mechanically supported helps protect the electrical connection at the terminal 214 by distributing forces which may be applied to the cable during use on a construction site to the stronger, wrapped configuration at the post 212, instead of directly to the electrical connection at the terminal 214. The terminal 214 is electrically connected to the power supply PCB 302 (not shown in FIG. 2; shown schematically in FIG. 3).

The housing 202 also defines a lower opening 216 configured to house the power supply PCB 302, and an upper opening 218 configured to house the user interface assembly 304. The upper opening is delimited by a plurality of upper housing wall segments 211, 213, 215, 216, 217, 219, 221 and an upper shelf surface 222. The user interface assembly 304 rests on the upper shelf surface 222, and the wall segments 211, 213, 215, 216, 217, 219, 221 support the outer perimeter of the user interface assembly 304, thereby providing structural support and protection to the user interface assembly 304 and other components within the upper and lower surfaces 216, 218.

The user interface assembly 304 includes a user interface PCB 306 having a digital display 308, LED indicators 310, a pair of control knobs 312, 314 (one shown), and a welding process selection button 316. The user interface assembly 304 is configured to provide weld control information to the user via the digital display and LED indicators. The control knobs and welding process selection button 316 provide controls for the user to set welding parameters. While one particular example of a user interface is described, in other examples any desired user input and/or display may be implemented to communicate information from the power source 102 to the user, and to facilitate user control of the power source 102 from the control remote 106.

Figure 3:
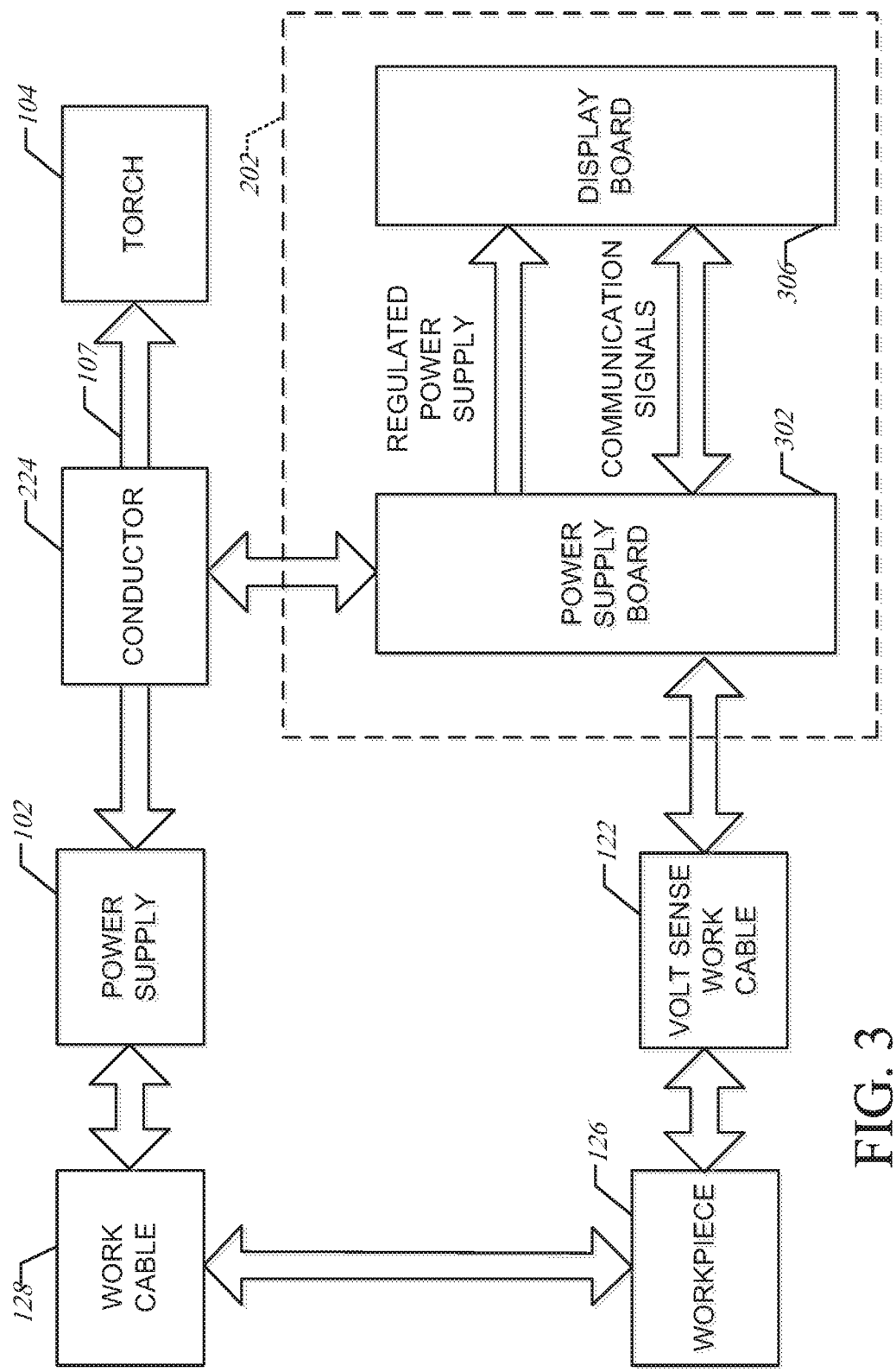
FIG. 3 depicts a schematic diagram of the control remote of FIG. 1.

As shown schematically in FIG. 3, the power supply PCB 302 is electrically connected to the volt sense work cable 122 (via conductor 224 and terminal 214, as shown in FIG. 2), and also connected to the secondary weld cable 107, as described in more detail below. The power supply PCB 302 is also electrically connected to the user interface PCB 306. The power supply PCB 302 is configured to provide a regulated power supply to the user interface PCB 306, and further configured to pass weld control signals between the secondary weld cable 107 and the volt sense work cable 122. In examples, the configuration allows for remote control of the power source 102 via the user interface assembly 304, and further the display of welding parameter information from the power source 102. For example, in the example shown, the user could rotate one of the control knobs 312, 314 to adjust output amperage at the torch 104, or select between welding processes by actuating the process selection button 316. A user could also view the current process and amperage displayed on the digital display 308. While one example has been described, any desired user interface and control configuration desired may be implemented.

Returning to FIG. 2, the housing 202 further includes a clamp sub-housing 270 located within the lower opening 216. The clamp sub-housing 270 in the example of FIG. 2 is rectangular in shape, but other shapes are possible. The clamp sub-housing 270 includes a lead opening 274 configured to accommodate a tapping lead 224.

The tapping lead 224 can be a conductor to electrically tap into the secondary weld cable 107, and is connected to the power supply PCB 302, thereby electrically connecting the secondary weld cable 107 to the power supply PCB 302. Tapping lead 224 is made from an electrically conductive material, and includes a connection end 226 that electrically connects to the power supply PCB 302 by any desired connection, such as the spade connection shown, a central portion 228, and a tapping end 230 with a piercing tip 232 (see, e.g., FIGS. 4-5). The central portion 228 is passed through the lead opening 274 of the clamp sub-housing 270.

In alternative examples, a non-piercing connecting pin contacts a designated location on a surface of the secondary weld cable 107 that is electrically connected to the conductive cable 111 to ensure electrical contact without the need to pierce the insulated sheathing 109. For instance, an electrical "via" can be presented through the insulated sheathing 109 of the secondary weld cable 107 such that electrical contact is achieved between the power supply PCB 302 and the conductive cable 111. Additionally or alternatively, the conductive cable 111 can be exposed by cutting away or otherwise removing the insulated sheathing 109. Thus, a variety of conductors can be employed to connect the conductive cable 111 to the power supply PCB 302 without the use of a piercing element.

When the power supply PCB 302 is connected to the secondary weld cable 107 and a communication circuit is established. In the example of FIG. 3, the power supply PCB 302 is connected to a power supply 102 via the secondary weld cable 107, a work cable 128 is connected between the conductive workpiece 126 and the power supply 102, and the volt sense cable 122 connects the workpiece 126 back to the power supply PCB 302. The torch 104 is also connected via the secondary weld cable 107. The power supply PCB 302 may communicate with the power supply via the communication circuit. For example, the power supply PCB 302 can include a transceiver to transmit data packets of desired welding operational parameters to a receiver within the power source 102 across the welding cable. Advantageously, incorporation of a transceiver within control remote 106 that communicates with a transceiver in the power source 102 directly through the welding cable eliminates the need for separate control and power cables.

In order to send and receive information, the control remote 106, via an electrical controller of the power supply PCB 302, can use serializing and modulating circuits to transfer serialized and modulated data packets to the welding power source 102 across a welding cable (e.g., primary welding cable 108, secondary welding cable 107). Example information to be communicated to the power source 102 from the control remote 106 includes welding power source output information (e.g., amperage/voltage control), welding circuit on/off information (e.g., power source output control), and power source mode control (e.g., constant voltage/constant current). In some examples, the power source 102 includes a decoder to decode the data packet and input the decoded data to an electrical controller for dynamic control of the power source 102 between transceivers in the power source 102 and the control remote 106. In this regard, bi-directional communication is supported between the control remote 106 and the power source 102. It is contemplated, however, that the control remote 106 may be equipped with a transmitter and the power source 102 with a receiver to support unidirectional communication between the control remote 106 and the power source 102.

In one example, the torch 104 in use is equipped with a pushbutton trigger that when depressed causes a transceiver of the electrical controller within control remote 106 to transmit command signals to a receiver and power source 102 through welding cable. Additionally or alternatively, the user may select operational parameters on a user panel (e.g., user interface PCB 306) of the control remote 106. As such, the user panel allows the user to control the welding process without leaving the welding site. Therefore, the welding system 100 supports communication between the power source 102 and the control remote 106 during both a welding operation and a non-welding operation, such as in a stand-by mode.

The command signals include information regarding desired operational welding parameters of the control remote 106 and instructs the transceiver of the power source 102 to set the magnitude of the output of the welding power source 102 (e.g., volts or amperes), the mode of the welding power source 102 (e.g., CC or CV), and wire feed speed, among other parameters. Accordingly, the present system provides for an exchange of information while avoiding inclusion of a separate, dedicated data conductor connecting the control remote 106 and power source 102.

Example communication methods for communicating via a weld circuit that may be implemented by the control remote 106 are described in U.S. Pat. No. 7,180,029, issued Feb. 20, 2007, entitled "Method and system for a remote wire feeder where standby power and system control are provided via weld cables," and U.S. Patent Application Publication No. 2007/0080154, published Apr. 12, 2007, entitled "Remote Wire Feeder Using Binary Phase Shift Keying to Modulate Communications of Command/Control Signals to be Transmitted Over a Weld Cable." U.S. Pat. No. 7,180,029 and U.S. Patent Application Publication No. 2007/0080154 are incorporated herein by reference.

Figure 4:
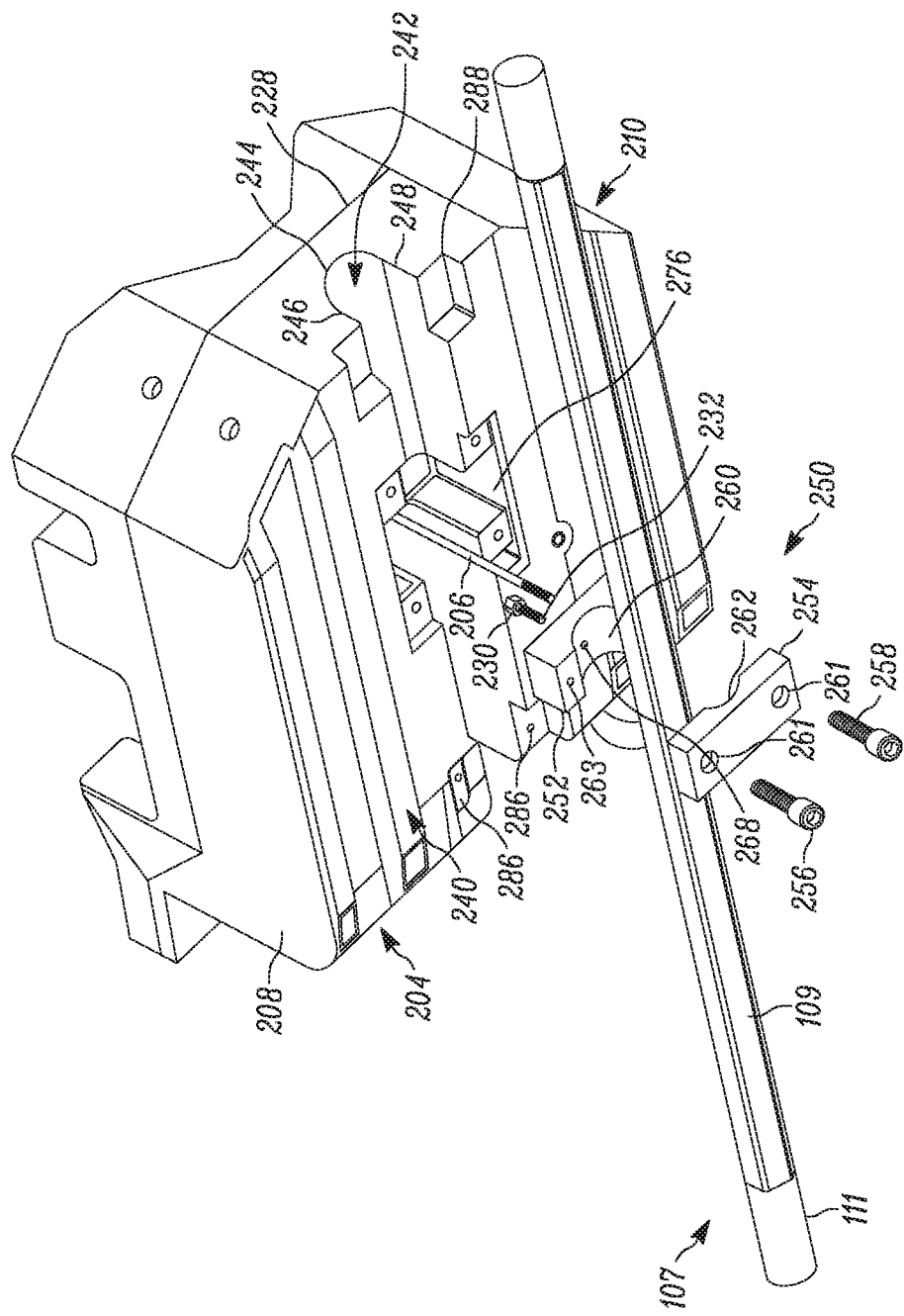
FIG. 4 depicts a lower perspective view of the power supply connection shown in FIG. 2.
Figure 5:
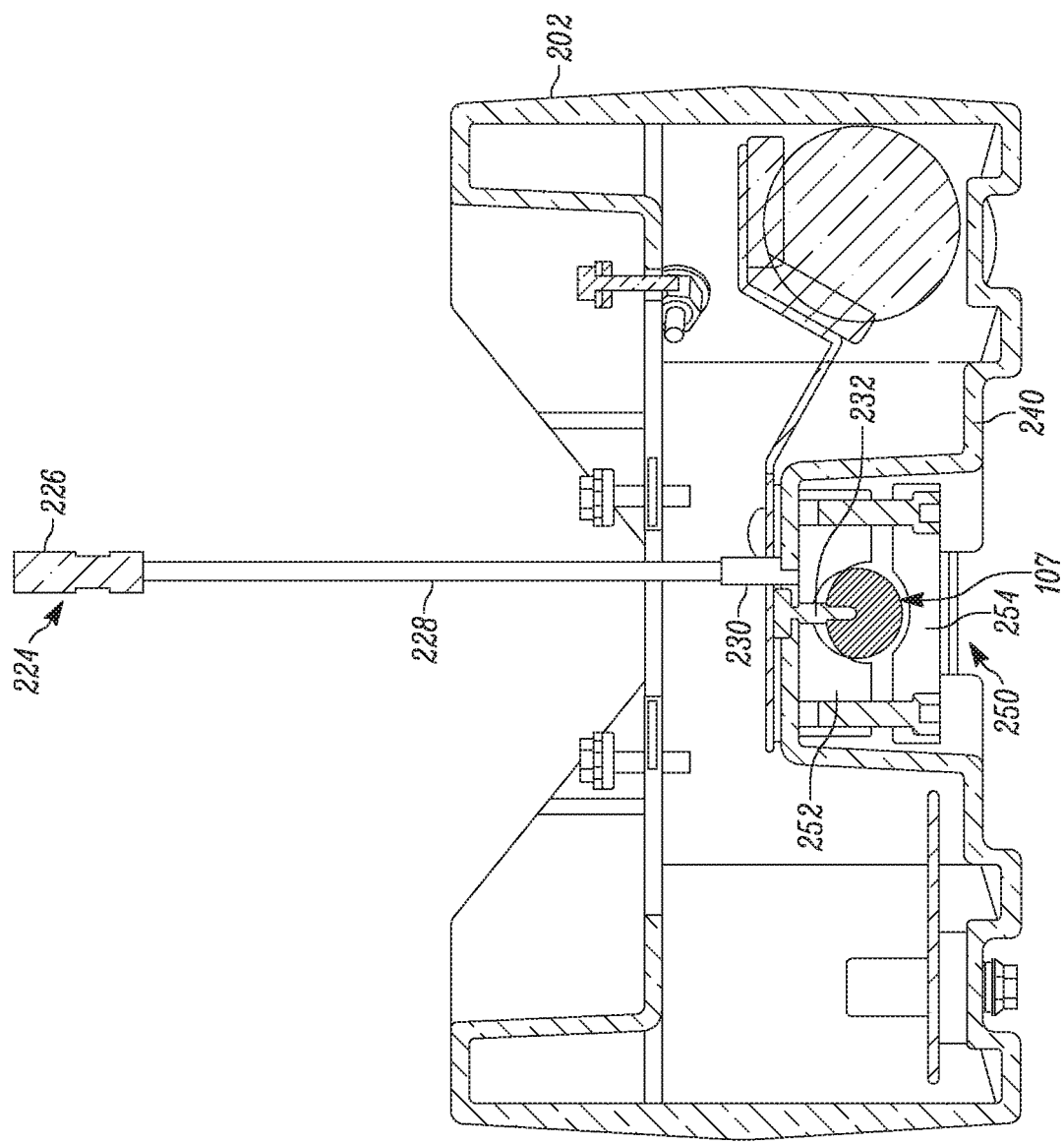
FIG. 5 depicts a side perspective view of the power supply connection of FIG. 2 with a piercing lead that is not connected to a power supply printed circuit board.
Figure 6:
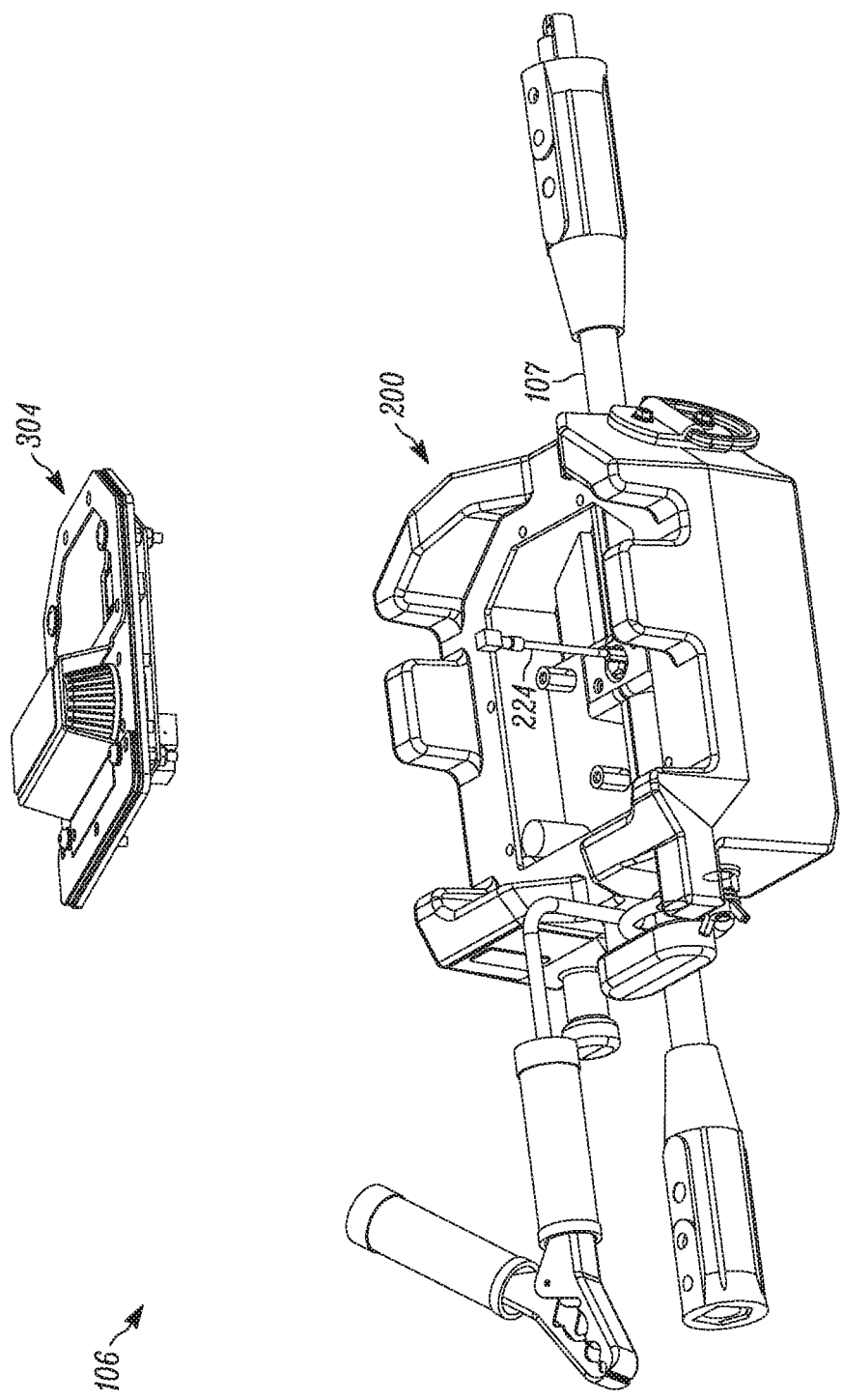
FIG. 6 depicts an upper perspective view of the control remote with a piercing lead that is not connected to a power supply printed circuit board.

Turning to FIG. 4, partially exploded view of the lower side of the connection assembly 200 is shown with the assembly being mechanically connected and electrically tapped into the secondary weld cable 107 (shown with the connections 114, 120 removed, and the interior of the weld cable 107 exposed for descriptive purposes). As mentioned, secondary weld cable 107 has a single conductive cable or wire 111, and has an insulated sheathing 109. A lower surface 240 of housing 202 includes a weld cable channel 242 defined in the bottom surface between the side surfaces 204, 206 that is sized and shaped to receive the secondary weld cable 107. In the example shown, the weld channel 242 is defined by a seating surface 244 and a pair of extension portions 246, 248. The seating surface 244 is generally cylindrically shaped, and has a diameter approximately equal to or slightly larger than the outer diameter of the secondary weld cable 107, enabling the secondary weld cable 107 to be seated against the seating surface 244. As shown, the seating surface 244 is offset from the lower surface 240 by extension portions 246, 248, resulting in a space between the seating portion 244 and the lower surface 240 of the housing 202 that enables the secondary weld cable 107 to be positioned within the cable channel 242 without protruding beyond the lower surface 240 of the housing 202 (see, e.g., FIG. 5). As a result, the secondary weld cable 107 remains protected within the housing 202.

While one particular shape for the channel has been described, other configurations are possible. In one example, only the cylindrical seat is present without the extension sections. In another example, a cylindrical channel with a larger diameter is utilized. In yet another example, a groove is provided to seat the cable. In other examples, the groove runs along the bottom surface. Any desired configuration may be used.

With reference to FIG. 4, the clamp sub-housing 270 (e.g., FIG. 2) defines a receiver slot 276 in the lower surface 240 of the housing 202. The receiver slot 276 is sized and configured to receive a connector assembly 250 of the connection assembly 200.

Figure 7:
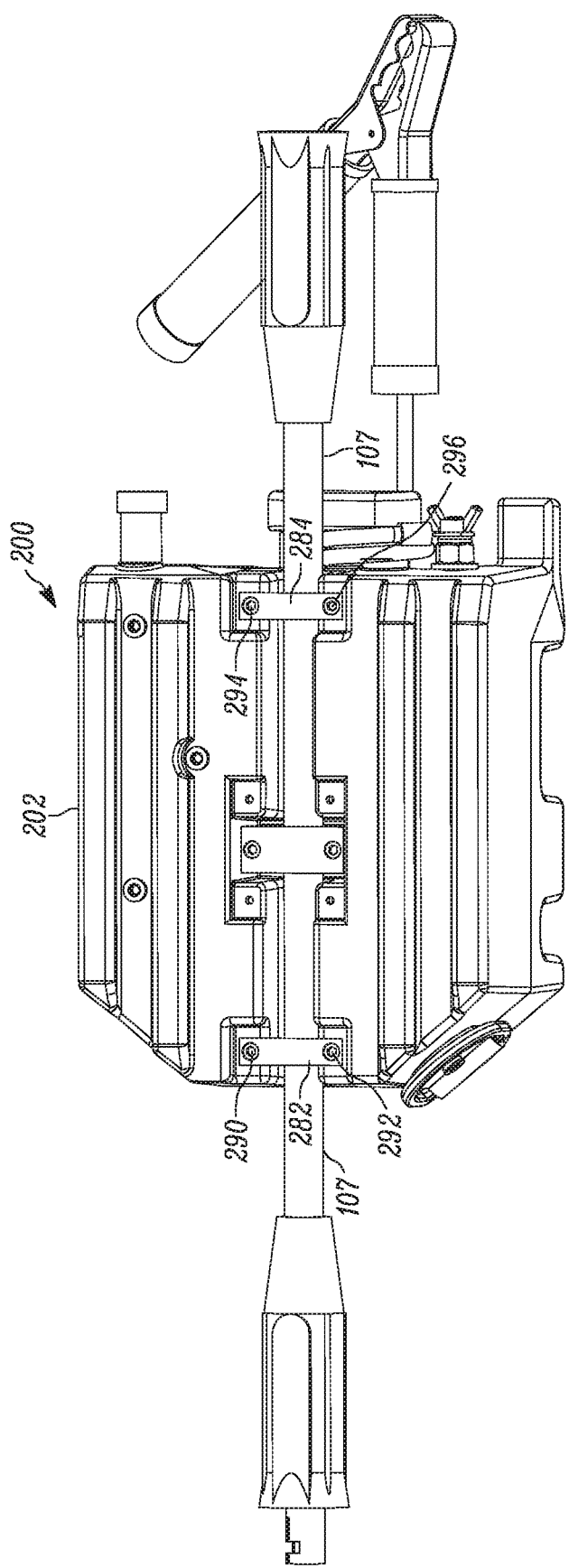
FIG. 7 depicts a bottom perspective view of the power supply connection shown in FIG. 2.

In the example shown, the connector assembly 250 is a clamping assembly that includes first and second clamps 252, 254, and a pair of fasteners 256, 258. The first clamp 252 has a transverse opening 260, and the second clamp has a corresponding transverse opening 262. The openings 260, 262 correspond to the shape of the secondary weld cable 107. The first clamp 252 is positioned within the receiver slot 276 with the piercer tip 232 of the tapping lead 224 positioned within and protruding from a piercer opening 268 of the first clamp 252. Clamp 252 is secured to the housing 202 by, for example, fasteners or screws which may, in examples, be secured through openings 273, 275 of the clamp sub-housing 270 as shown in FIG. 2. The secondary welding cable is positioned within the channel 242, which coincides with the opening 260 of the first clamp 252. The second clamp 254 is positioned around the secondary weld cable 107, and the fasteners are placed through the corresponding openings 261, 263 of the first and second clamps 252, 254 and tightened together (one of the openings, opening 263, is not shown in FIG. 4 as it is out of view due to the secondary weld cable 107). With the second clamp 252 fastened to the first clamp 252, the piercing tip 232 is positioned through the sheath 109 of the secondary weld cable 107 and into contact with a conductive cable or wire 111 of the secondary weld cable 107 (see FIG. 5). The lower surface 240 of the housing 202 further includes additional clamp slots 286, 288. Additional clamps 282, 284 (shown in FIG. 7) are positioned around the cable and secured to the housing 202 within the respective clamp openings 286, 288 (shown in FIG. 4). As shown in FIG. 7, mechanical fasteners 290, 292, 294, 296 hold the clamps 282, 284 in place to secure the secondary weld cable 107 to the housing 202.

With the tapping lead 224 electrically connecting the secondary control cable 107 to the power supply PCB 302, and the power supply PCB 302 further connected to the volt sense work cable 122, as mentioned, a circuit is formed between the remote 106 and the power source 102 via the primary weld cable 108, secondary weld cable 107, the control remote 106, volt sense work cable 122, workpiece 126, and the power source work cable 128. This electrical connection enables power transmission from the power supply to the control remote 106 in order to power the control remote 106, and further enables an electrical path to communicate weld control signals between the power source 102 and the control remote 106. With the power supply PCB 302 electrically connected to the user interface PCB 306, the system is able to communicate welding parameter information from the welding power source to the user at the control remote 106, and further able to receive input from the user in order to change welding parameters of the welding power source from the control remote 106.

As will be recognized, the connection assembly 200 described allows for the control remote 106 to tap into the secondary weld cable 107 outside of the housing 202 of the control remote 106. This enables a user to change a damaged weld cable in the field without exposing the sensitive electronics inside of the control remote 106 to debris, water, weld shavings and other contaminates that could damage the unit. In the field, the user may simply remove the fasteners 256, 258 from the second clamp 254, remove the clamp 254, and remove the old cable 107 from the channel 242. Then, to install a new cable, the user simply places a new cable within the channel 242, aligns the second clamp 254 properly, and screws in the fasteners 256, 258. By screwing in the fasteners, the clamp 254 is pulled towards the clamp 252. Consequently, the new cable is pulled within the openings 260 towards the clamp 252 to seat the cable within the channel 242, which also causes the piercing tip 232 of the tapping lead 224 to pierce through the sheathing 109 into contact with the cable or wire 111.

Figure 8:
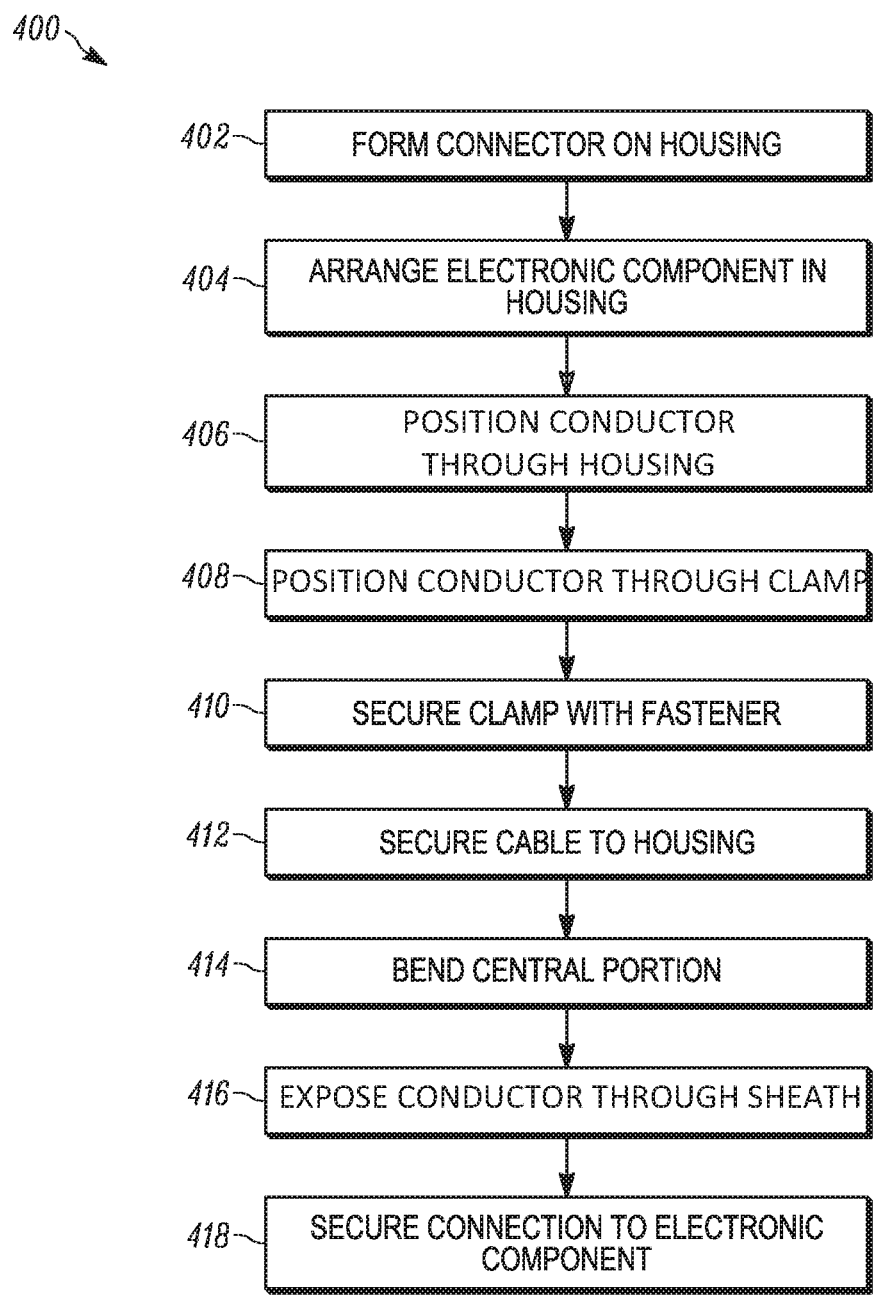
FIG. 8 shows a flowchart illustrating an example method which may be implemented to manufacture or assemble a control remote such as the control remote of FIG. 2.

FIG. 8 illustrates an example method 400 of manufacturing or assembling the control remote 106 of FIGS. 1-7. Referring to FIG. 8, at block 402, the connector, for example the connector assembly 250, is formed on housing 202 of the control remote 106. At block 404, the electronic component, such as provided by the user interface assembly 304, is arranged in the housing 202. At block 406, a conductor, such as the tapping lead 224, is positioned through the lead opening 274 of the housing 202. At block 408, a portion of the conductor, such as the piercing tip 232, is positioned through an opening of the first clamp 252. At block 410, the clamp 252 is secured within the receiver opening 276 by one or more fasteners 256, 258. At block 412, the secondary welding cable 107 is secured to the housing 202 by the connector 250. At block 414, the central portion 228 is bent from a position shown in FIG. 6 to a position shown in FIG. 2. At block 416, the conductor is exposed through sheathing 109, such as pierced with a lead using the piercing tip 232, and connected to the electronic component in order to connect the secondary welding cable 107 with the electronic component. At block 418, the connection end 226 of the piercing element is then secured to the power supply PCB 302. However, in other examples, the bend in the central portion is pre-formed in the piercing lead. Any desired configuration may be utilized in order to connect the connection end of the lead to the power supply PCB 302.

While certain examples have been described, many other examples are within the scope of the disclosure. For example, while the weld cable is described above as connected to a secondary weld cable which connects to the torch cable, in other examples, the secondary cable is eliminated. Any number of desired cables may be used to connect the power source to the torch, and the control remote can tap into any of the cables desired. Moreover, while a TIG welder has been described, the controls can also be implemented with other welding technologies, such as MIG welders and/or stick welders. The design of the housing with the channel, clamping openings, clamps and the piercer may also be implemented into other control remotes, pendants, feeders, power sources, etc. For example, in one example the design is incorporated into the housing of a MIG feeder. The piercing lead may also take any other desired form or shape.

The present invention has been described in the terms of examples. Equivalents, alternatives, and/or modifications, in addition to those expressly stated, are possible and within the scope of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present methods and/or systems are not limited to the particular implementations disclosed, but include all implementations falling within the scope of the appended claims.

What is claimed is:

1. A connection assembly for a welding power supply remote interface, comprising:
   a housing configured to house at least one electronic component;
   a connector configured to secure a weld cable to the housing, the weld cable having at least one conductive wire and a sheathing, wherein the connector further comprises a fixed portion secured to an exterior surface of the housing and a moveable portion fastenable to the fixed portion by at least one fastener;
   a volt sense cable connected to a conductive workpiece; and
   a conductive element connected to the at least one electronic component, the conductive element configured to extend through the sheath and to contact the at least one conductive wire to electrically connect the at least one conductive wire with the at least one electronic component.

2. The connection assembly of claim 1, wherein the weld cable is connected to one of a consumable-electrode weld torch, a non-consumable electrode weld torch, a spool gun weld torch, a push-pull weld torch, and a stick electrode holder.

3. The connection assembly of claim 1, wherein the at least one electronic component is configured to generate control signals for a power supply in response to a user input.

4. The connection assembly of claim 3, wherein the control signals include one or more of amperage and a welding process.

5. The connection assembly of claim 1, wherein the at least one electronic component comprises a visual display and an indicator light configured to identify information on the digital display as representing at least one of amperage, a current welding process, weld voltage, arc control, a weld parameter, and an alert.

6. The connection assembly of claim 1, wherein the conductive element comprises a piercing tip to pierce through the sheath, and
   when the at least one fastener is in a first position, the moveable portion of the connector is spaced apart from the housing at a distance greater than a diameter of the weld cable; and
   when the fastener is in a second position, the moveable portion of the connector is spaced apart from the housing at a distance equal to or less than a diameter of the weld cable such that the piercing element is pierced through the sheathing and in contact with the at least one conductive wire.

7. The connection assembly of claim 1, the weld cable further comprising:
   a first connector at a first end of the electrical cable configured to connect to a power supply or a supply cable; and
   a second connector at a second end of the electrical cable configured to connect to a welding torch supply cable or a weld accessory.

8. The connection assembly of claim 7, wherein the first connector is configured to connect to a corresponding connector of the supply cable, and the second connector is configured to connect to a corresponding connector of the welding torch supply cable or the weld accessory.

9. The connection assembly of claim 7, wherein the welding torch comprises one of a consumable-electrode weld torch, a non-consumable electrode-weld torch, a spool gun weld torch, a push-pull weld torch, and a stick electrode holder.

10. The connection assembly of claim 1, wherein a communication circuit is formed between the conductive workpiece and a power supply by connections between a welding remote power supply interface, the power supply, the volt sense cable, an electrical cable, the weld cable and a work cable.

11. The connection assembly of claim 1, wherein a power supply operates in one or more modes including at least one of constant voltage or constant current.

12. The connection assembly of claim 1, wherein the conductive element is a connecting pin contact configured to electrically connect to the conductive wire.

13. A connection assembly for a welding power supply remote interface, comprising:
   an electrical controller to transmit and receive information associated with one or more welding parameters between the welding power supply remote interface and a welding power supply, the electrical controller comprising a modulating circuit to transfer modulated data packets to the welding power supply via a weld cable;
   a housing configured to house the electrical controller;
   a volt sense cable connected to a conductive workpiece;
   a connector configured to secure the weld cable to the housing, the weld cable having at least one conductive wire and a sheathing; and
   a piercing element connected to the electrical controller, the piercing element configured to pierce through the sheath and to contact the at least one conductive wire to electrically connect the at least one conductive wire with the electrical controller.

14. The connection assembly of claim 13, wherein the electrical controller is configured to generate control signals for the welding power supply in response to a user input.

15. The connection assembly of claim 14, wherein the control signals include one or more of welding power supply output information, welding power supply output control, and welding power supply mode control.

16. The connection assembly of claim 13, the electrical controller configured to transmit and receive information during both a welding operation and a non-welding operation.

17. The connection assembly of claim 13, the at least one electrical component comprising a digital display including a visual display and at least one indicator light to display at least one of amperage, a current welding process, weld voltage, arc control, a weld parameter, and an alert.

18. The connection assembly of claim 13, wherein the weld cable is connected to one of a consumable-electrode weld torch, a non-consumable electrode weld torch, a spool gun weld torch, a push-pull weld torch, and a stick electrode holder.

19. The connection assembly of claim 13, wherein the piercing element is a tapping lead.

20. The connection assembly of claim 19, wherein the tapping lead comprises a piercing tip to pierce through the sheathing.

\* \* \* \* \*